(12) United States Patent
Uchimoto et al.

(10) Patent No.: US 8,569,975 B2
(45) Date of Patent: Oct. 29, 2013

(54) CONTROL CIRCUIT FOR SWITCHING POWER SUPPLY

(75) Inventors: Daisuke Uchimoto, Kyoto (JP); Naoki Inoue, Kyoto (JP); Yoju Imamura, Kyoto (JP)

(73) Assignee: Rohm Co., Ltd. (JP)

( * ) Notice: Subject to any disclaimer, the term of this patent is extended or adjusted under 35 U.S.C. 154(b) by 253 days.

(21) Appl. No.: 13/089,694

(22) Filed: Apr. 19, 2011

(65) Prior Publication Data

US 2011/0273104 A1 Nov. 10, 2011

(30) Foreign Application Priority Data

Apr. 23, 2010 (JP) ................................. 2010-100239

(51) Int. Cl.
*H05B 37/02* (2006.01)
*H05B 41/36* (2006.01)

(52) U.S. Cl.
USPC ............................ 315/307; 315/210; 315/224

(58) Field of Classification Search
USPC ......... 315/307, 297, 312, 320, 257, 291, 210, 315/224; 345/82
See application file for complete search history.

(56) References Cited

U.S. PATENT DOCUMENTS

| | | | |
|---|---|---|---|
| 7,923,943 B2 * | 4/2011 | Peker et al. | 315/312 |
| 2009/0284178 A1 * | 11/2009 | Jessenig et al. | 315/297 |

FOREIGN PATENT DOCUMENTS

JP 2008-186668 A 8/2008

* cited by examiner

*Primary Examiner* — Daniel D Chang

(74) *Attorney, Agent, or Firm* — Cantor Colburn LLP

(57) ABSTRACT

A control IC controls a switching power supply configured to supply a driving voltage Vout to one terminal of an LED string which is driven in an intermittent manner. A sample-and-hold circuit performs sampling of a detection voltage Vs that corresponds to a driving voltage Vout in the on period, and holds the sampled detection voltage Vs in the off period. In the off period, a pulse modulator generates a pulse signal having a duty ratio adjusted such that a hold detection voltage VsH output from the sample-and-hold circuit matches the detection voltage Vs. A driver drives a switching transistor according to the pulse signal.

12 Claims, 6 Drawing Sheets

CONTROL CIRCUIT FOR SWITCHING POWER SUPPLY

BACKGROUND OF THE INVENTION

1. Field of the Invention

The present invention relates to a light emitting apparatus.

2. Description of the Related Art

In recent years, as a backlight of a liquid crystal panel or as an illumination device, a light emitting apparatus is employed, which is configured using a light emitting element such as an LED (light emitting diode) or the like. FIG. 1 is a circuit diagram which shows an example configuration of a light emitting apparatus according to a comparison technique. A light emitting apparatus 1003 includes multiple LED strings 1006_1 through 1006_n, a switching power supply 1004, and a current driving circuit 1008.

Each LED string 1006 includes multiple LEDs connected in series. The switching power supply 1004 boosts an input voltage Vin, and supplies a driving voltage Vout to one terminal of each of the LED strings 1006_1 through 1006_n.

The current driving circuit 1008 includes current sources $CS_1$ through $CS_n$ which are respectively provided to the LED strings 1006_1 through 1006_n. Each current source CS supplies, to the corresponding LED string 1006, a driving current $I_{LED}$ that corresponds to the target luminance level.

The switching power supply 1004 includes an output circuit 1102 and a control IC 1100. The output circuit 1102 includes an inductor L1, a switching transistor M1, a rectifier diode D1, and an output capacitor C1. The control IC 1100 controls the on/off duty ratio of the switching transistor M1 so as to adjust the driving voltage Vout.

RELATED ART DOCUMENTS

Patent Documents

[Patent document 1]
Japanese Patent Application Laid Open No. 2008-186668

With such a light emitting apparatus 1003, in some cases, in order to adjust the luminance level of each LED string 1006, a PWM (Pulse Width Modulation) control operation is performed on the driving current $I_{LED}$. Specifically, a PWM controller 1009 of the current driving circuit 1008 generates pulse signals $PWM_1$ through $PWM_n$ each having a duty ratio that corresponds to the luminance level so as to perform a switching control operation on the respective current sources $CS_1$ through $CS_n$. Such a control operation is also referred to as the "burst dimming control operation" or "burst control operation".

The load current (output current) Iout of the switching power supply 1004 is the sum of the LED currents. The PWM driving operation for the LED strings 1006 involves the switching of the load current Iout, leading to fluctuation in the output voltage Vout. The fluctuation in the output voltage Vout becomes a factor contributing to instability in the luminance level of the LED strings 1006. In a case in which such a light emitting apparatus 1003 is employed as a backlight of a liquid crystal panel or is employed as an illumination apparatus, this becomes a factor contributing to flicker, which is undesirable.

SUMMARY OF THE INVENTION

The present invention has been made in order to solve such a problem. Accordingly, it is an exemplary purpose of the present invention to provide a control circuit which is capable of stabilizing the output voltage in a PWM driving operation.

An embodiment of the present invention relates to a control circuit for a switching power supply configured to supply a driving voltage to one terminal of a light emitting element configured to be intermittently driven. The control circuit comprises: a sample-and-hold circuit configured to perform sampling of a detection voltage that corresponds to the driving voltage generated in an on period of the light emitting element, and to hold the detection voltage thus sampled in an off period of the light emitting element; a pulse modulator configured to generate a pulse signal having a duty ratio adjusted in an off period of the light emitting element such that the detection voltage matches a hold detection voltage output from the sample-and-hold circuit; and a driver configured to drive a switching element of the switching power supply according to the pulse signal.

Such an embodiment is capable of maintaining the output voltage of the switching power supply at an appropriate level even when the light emitting element is switched between the on state and the off state.

Also, the sample-and-hold circuit may comprise: a capacitor arranged such that one terminal thereof is set to a fixed electric potential in the on period; a buffer configured to generate a voltage that corresponds to the detection voltage; and a switch arranged between the other terminal of the capacitor and an output terminal of the buffer, and configured to switch on in the on period of the light emitting element, and to switch off in the off period thereof. Also, the voltage that occurs at the capacitor may be output as the hold detection voltage.

Also, the pulse modulator may be configured to adjust the duty ratio of the pulse signal in the on period of the light emitting element such that a voltage that occurs at the other terminal of the light emitting element matches a predetermined reference voltage.

Also, the control circuit may comprise: an error amplifier arranged such that the voltage that occurs at the other terminal of the light emitting element is input to a first input terminal thereof, the detection voltage is input to a second input terminal thereof, and a third input terminal thereof selectively receives, as an input signal, the reference voltage in the on period and the hold detection voltage in the off period, and which is configured to output an error signal that corresponds to the difference between the reference voltage and the voltage that occurs at the other terminal of the light emitting element in the on period, and to output an error signal that corresponds to the difference between the detection voltage and the hold detection voltage in the off period; a pulse width modulator configured to generate, in the on period, a pulse signal having a duty ratio that corresponds to the error signal; and a pulse frequency modulator configured to generate, in the off period, a pulse signal having a duty ratio that corresponds to the error signal.

Another embodiment of the present invention relates to a light emitting apparatus. The light emitting apparatus comprises: a light emitting element; a switching power supply configured to supply a driving voltage to one terminal of the light emitting element; and a current driving circuit connected to the other terminal of the light emitting element, and configured to supply an intermittent driving current that corresponds to a target luminance. The switching power supply comprises: an output circuit comprising a switching element; and a control circuit according any one of the aforementioned embodiments, configured to drive the switching element.

Yet another embodiment of the present invention also relates to a light emitting apparatus. The light emitting apparatus comprises: multiple light emitting elements; a switching power supply configured to supply an independent driving voltage to one terminal of each of the multiple light emitting elements; and a current driving circuit configured to supply, to each of the multiple light emitting elements, an intermittent driving current that corresponds to a target luminance. The switching power supply comprises: an output circuit comprising a switching element; and a control circuit according to any one of the aforementioned embodiments, configured to drive the switching elements. The output circuit comprises: an input terminal via which an input voltage is to be applied; multiple output terminals via which the driving voltages are respectively output to the respective multiple light emitting elements; an inductor and a switching element sequentially connected in series between the input terminal and a fixed voltage terminal; multiple rectifier elements respectively provided to the multiple output terminals, and arranged such that one terminal of each of the rectifier elements is connected to a corresponding output terminal, and the other terminal of each of the rectifier elements is connected to a connection node that connects the inductor and the switching element; and multiple output capacitors respectively provided to the multiple output terminals, and each arranged between a corresponding output terminal and the fixed voltage terminal.

Such an embodiment is capable of preventing the output voltage of the switching power supply from being greatly reduced in a period in which multiple light emitting elements are illuminated at the same time in a case in which the on periods of the multiple light emitting elements are shifted in a temporal manner. Thus, such an arrangement suppresses fluctuation in the luminance.

Yet another embodiment of the present invention relates to an electronic device. The electronic device comprises: a liquid crystal panel; and a light emitting apparatus according to any one of the aforementioned embodiments, arranged as a backlight of the liquid crystal panel.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

In the present specification, the state represented by the phrase "the member A is connected to the member B" includes a state in which the member A is indirectly connected to the member B via another member that does not substantially affect the electric connection therebetween, or that does not damage the functions or effects of the connection therebetween, in addition to a state in which the member A is physically and directly connected to the member B.

Similarly, the state represented by the phrase "the member C is provided between the member A and the member B" includes a state in which the member A is indirectly connected to the member C, or the member B is indirectly connected to the member C via another member that does not substantially affect the electric connection therebetween, or that does not damage the functions or effects of the connection therebetween, in addition to a state in which the member A is directly connected to the member C, or the member B is directly connected to the member C.

Figure 1:
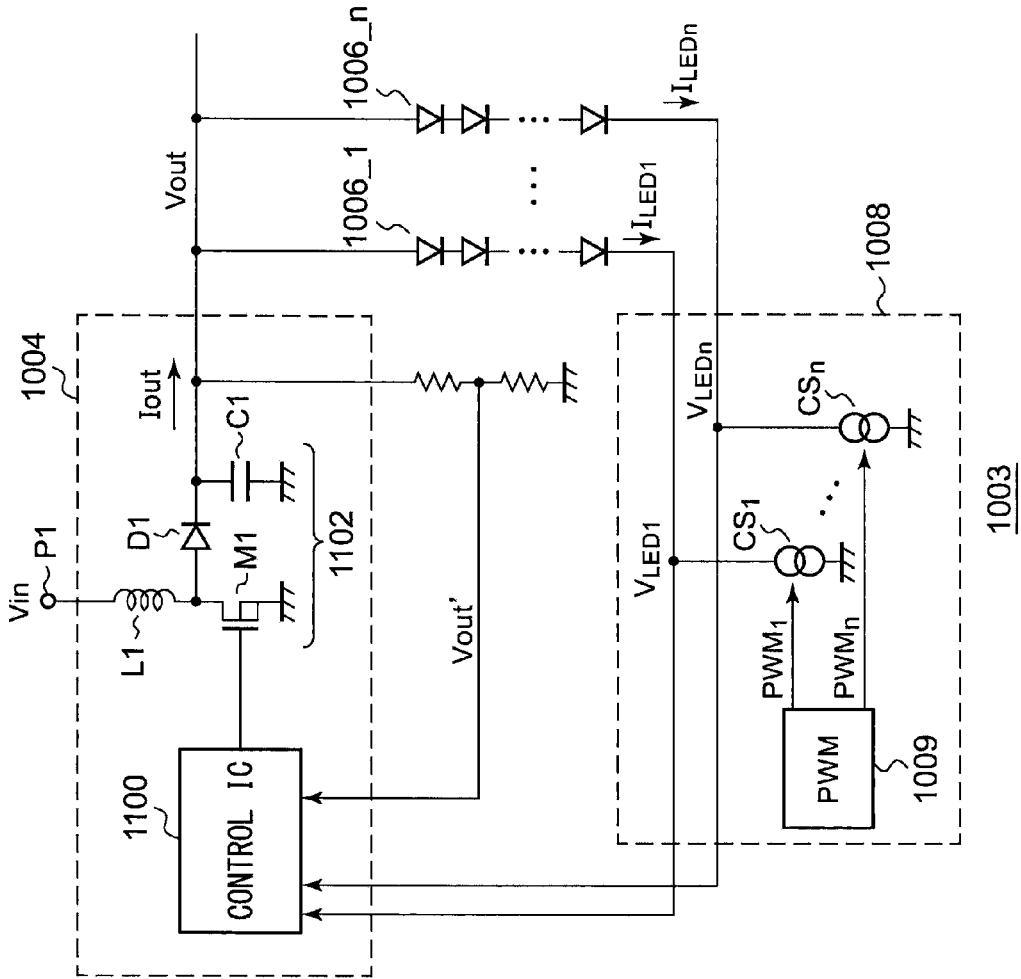
FIG. 1 is a circuit diagram which shows an example configuration of a light emitting apparatus according to a comparison technique.
Figure 2:
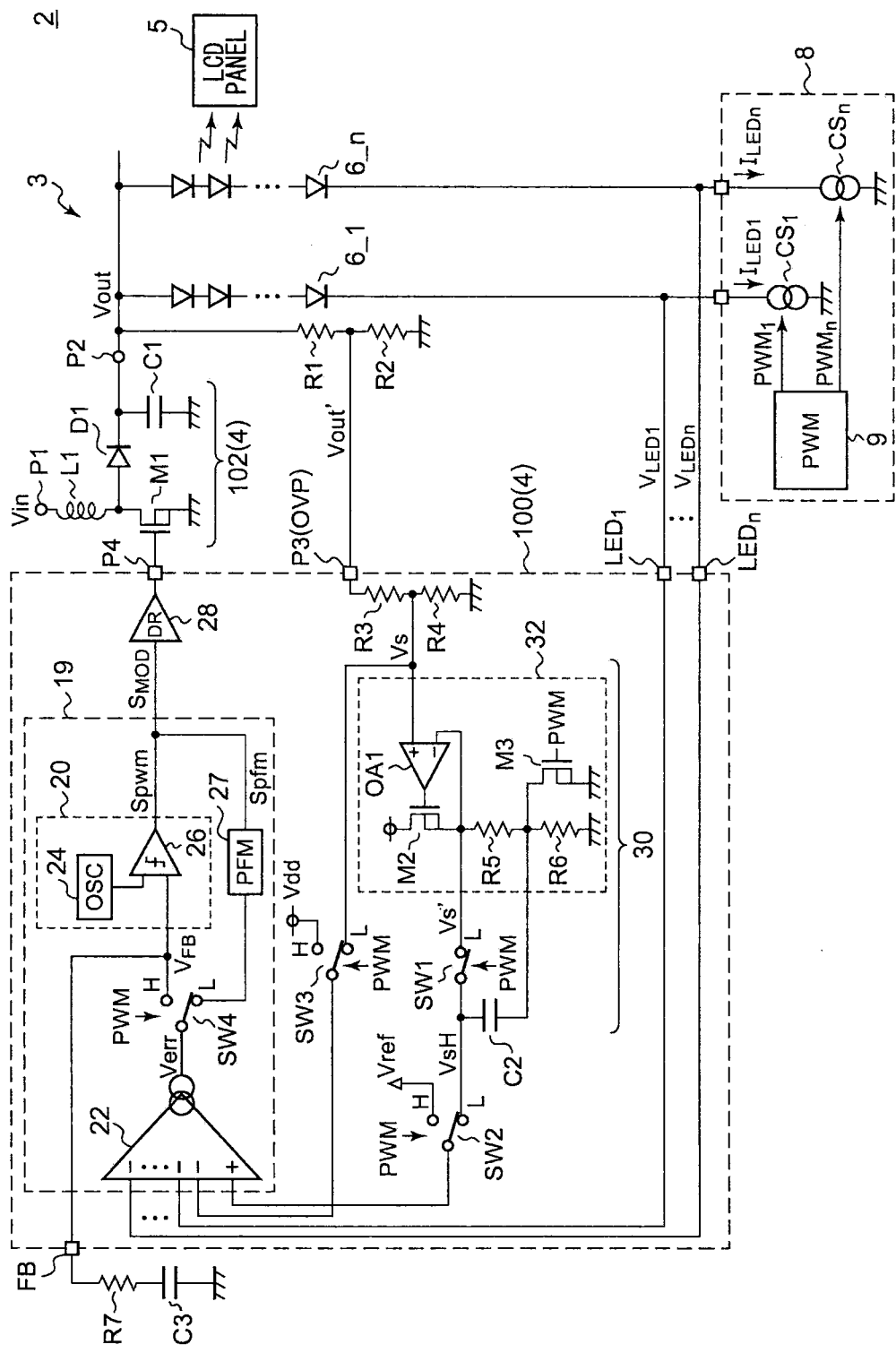
FIG. 2 is a circuit diagram which shows a configuration of an electronic device including a switching power supply according to an embodiment.

FIG. 2 is a circuit diagram which shows a configuration of an electronic device including a switching power supply according to an embodiment.

An electronic device 2 is configured as a battery-driven device such as a laptop PC, a digital still camera, a digital video camera, a cellular phone terminal, a PDA (Personal Digital Assistant), or the like. The electronic device 2 includes a light emitting apparatus 3 and an LCD (Liquid Crystal Display) panel 5. The light emitting apparatus 3 is arranged as a backlight of the LCD panel 5.

The light emitting apparatus 3 includes LED strings 6_1 through 6_n each configured as a light emitting element, a current driving circuit 8, and a switching power supply 4.

Each LED string 6 includes multiple LEDs connected in series. The switching power supply 4 is configured as a step-up DC/DC converter. The switching power supply 4 is configured to boost the input voltage (e.g., battery voltage) Vin input to an input terminal P1, and to output an output voltage (driving voltage) Vout via an output terminal P2. One terminal (anode) of each of the multiple LED strings 6_1 through 6_n is connected to the output terminal P2 so as to form a common anode terminal.

The switching power supply 4 includes a control IC 100 and an output circuit 102. The output circuit 102 includes an inductor L1, a rectifier diode D1, a switching transistor M1, and an output capacitor C1. The output circuit 102 has a typical topology, and accordingly, description thereof will be omitted.

A switching terminal P4 of the control IC 100 is connected to the gate of the switching transistor M1. The control IC 100 adjusts the on/off duty ratio of the switching transistor M1 by means of a feedback control operation so as to provide the output voltage Vout required to turn on the LED strings 6. It should be noted that the switching transistor M1 may be configured as a built-in component of the control IC 100.

The resistors R1 and R2 divide the output voltage Vout so as to generate a feedback voltage Vout' that corresponds to the output voltage Vout. The feedback voltage Vout' is input to a feedback terminal P3 (OVP terminal). When the feedback voltage Vout' exceeds a threshold value, an overvoltage protection circuit (not shown) performs an overvoltage protection operation.

The current driving circuit 8 is connected to the other terminal (cathode) of each of the multiple LED strings 6_1 through 6_$n$. The current driving circuit 8 respectively supplies, to the LED strings 6_1 through 6_$n$, intermittent driving currents $I_{LED1}$ through $I_{LEDn}$ that correspond to the respective target luminance levels. Specifically, the current driving circuit 8 includes multiple current sources $CS_1$ through $CS_n$ respectively provided to the LED strings 6_1 through 6_$n$, and a PWM controller 9. The i-th current source $CS_i$ is connected to the cathode of the corresponding i-th LED string 6_$i$. The current source $CS_i$ is configured to be capable of switching its state between an operating (active) state in which it outputs a driving current $I_{LEDi}$ and an off state in which the supply of the driving current $I_{LEDi}$ is stopped. The PWM controller 9 generates control signals $PWM_i$ through $PWM_n$ each having a duty ratio that corresponds to the corresponding target luminance level, and outputs the control signals thus generated to the current sources $CS_1$ through $CS_n$. In a period of time (on period $T_{ON}$) in which the control signal $PWM_i$ is asserted (set to high level, for example), the corresponding current source $CS_i$ enters the operating state $\phi_{ON}$, thereby turning on the LED string 6_$i$. In a period of time (off period $T_{OFF}$) in which the control signal $PWM_1$ is negated (set to low level, for example), the corresponding current source $CS_i$ is set to the off state $\phi_{OFF}$, thereby turning off the LED string 6_$i$. By controlling the time ratio between the on period $T_{ON}$ and the off period $T_{OFF}$, such an arrangement is capable of controlling the effective value (time average) of the driving current $T_{LED}$ that flows through the LED string 6_$i$, thereby allowing the luminance level to be adjusted.

The control IC 100 and the current driving circuit 8 are integrated on separate chips. Also, such components may be configured as a single package (module) or may be configured as separate packages. Alternatively, the control IC 100 and the current driving circuit 8 may be integrated on a single chip.

The above is the overall configuration of the light emitting apparatus 3. Next, description will be made regarding the configuration of the control IC 100. The control IC 100 includes LED terminals $LED_1$ through LED respectively provided to the LED strings 6_1 through 6_$n$. Each LED terminal $LED_i$ is connected to the cathode terminal of the corresponding LED string 6_$i$. It should be noted that there is not necessarily a need to provide such multiple LED strings. Also, the light emitting apparatus 3 may include a single LED string.

The control IC 100 principally includes a pulse modulator 19, a driver 28, a sample-and-hold circuit 30, and resistors R3 and R4. The resistors R3 and R4 divide the output voltage Vout input to the feedback terminal P3 so as to generate a detection voltage Vs that corresponds to the output voltage Vout.

The sample-and-hold circuit 30 performs sampling of the detection voltage Vs that corresponds to the driving voltage Vout in the on period $T_{ON}$ in which the LED strings 6 are turned on, and holds the sampled detection voltage Vs in the off period $T_{OFF}$ in which the LED strings 6 are turned off. The sample-and-hold circuit 30 outputs the detection voltage (which will be referred to as the "hold detection voltage") VsH thus held.

In the off period $T_{OFF}$, the sample-and-hold circuit 30 shown in FIG. 2 outputs the hold detection voltage VsH that is slightly higher than the detection voltage Vs sampled in the on period $T_{ON}$, and specifically, that is on the order of 5% higher than the detection voltage Vs.

The sample-and-hold circuit 30 includes a buffer 32, a switch SW1, and a capacitor C2. The buffer 32 generates a voltage Vs' that corresponds to the detection voltage Vs. The buffer 32 includes an operational amplifier OA1, a transistor M2, resistors R5 and R6, and a transistor M3. The transistor M2 and the resistors R5 and R6 are sequentially connected in series between the power supply terminal and the ground terminal. The operational amplifier OA1 is arranged such that the detection voltage Vs is input to the non-inverting input terminal thereof. The inverting input terminal of the operational amplifier OA1 is connected to a connection node that connects the transistor M2 and the resistor R5, which functions as an output terminal of the buffer 32. The buffer 32 outputs the voltage Vs' which is equal to the detection voltage Vs.

The transistor M3 is arranged in parallel with the resistor R6. The transistor M3 receives, as an input signal via a control terminal (gate) thereof, a control signal PWM which is used to control the on period and the off period of the LED strings 6. The transistor M3 is turned on in the on period $T_{ON}$, and is turned off in the off period $T_{OFF}$.

One terminal of the capacitor C2 is connected to a connection node that connects the resistors R5 and R6. When the transistor M3 is turned on in the on period $T_{ON}$, the aforementioned one terminal of the capacitor C2 is grounded, and thus, the aforementioned one terminal of the capacitor C2 is set to a fixed electric potential.

The switch SW1 is arranged between the other terminal of the capacitor C2 and the output terminal of the buffer 32. The on/off operation of the switch SW1 is controlled in synchronization with the control signal PWM. Specifically, the switch SW1 is turned on in the on period $T_{ON}$, and is turned off in the off period $T_{OFF}$.

When the switch SW1 is turned on and the transistor M3 is turned on in the on period $T_{ON}$, the detection voltage Vs' (=Vs) is applied to one terminal of the capacitor C2, and the other terminal of the capacitor C2 is grounded. As a result, the voltage $V_{C2}$ that occurs between both terminals of the capacitor C2 becomes equal to the detection voltage Vs'. Subsequently, when the switch SW1 is turned off and the transistor M3 is turned off in the off period $T_{OFF}$, the hold detection voltage VsH is represented by the following Expression (1).

$$VsH = V_{C2} + V_{R6} \tag{1}$$

Here, the relation $V_{R6} = Vs \times R6/(R5+R6)$ holds true, and accordingly, the hold detection voltage VsH is represented by the following Expression (1a).

$$VsH = Vs + Vs \times R6/(R5+R6) \tag{1a}$$
$$= (1 + R6/(R5+R6)) \times Vs$$

By determining the resistance value so as to satisfy the relation R6/(R5+R6)=0.05, such an arrangement is capable of generating the hold detection voltage VsH that is 5% higher than the detection voltage Vs.

The pulse modulator 19 generates a pulse modulation signal $S_{MOD}$ having a duty ratio adjusted such that the detection voltage Vs matches the hold detection voltage VsH output from the sample-and-hold circuit 30 in the off period $T_{OFF}$ in which the LED strings 6 are turned off.

The pulse modulator 19 adjusts the duty ratio of the pulse signal $S_{MOD}$ such that the lowest of the voltages (LED terminal voltages) $V_{LED1}$ through $V_{LEDn}$ that occur at the cathode terminals of the LED strings 6 matches a predetermined reference voltage Vref in the on period $T_{ON}$ in which the LED strings 6 are turned on.

The pulse modulator 19 includes an error amplifier 22, a pulse width modulator 20, a pulse frequency modulator 27, and a switch SW4.

The error amplifier 22 includes multiple inverting input terminals (−) and a single non-inverting input terminal (+). The multiple inverting terminals (first input terminals) respectively receive the LED terminal voltages $V_{LED1}$ through $V_{LEDn}$ as input signals. Furthermore, a different inverting input terminal (second input terminal) receives the detection voltage Vs as an input signal.

The non-inverting input terminal (third terminal) of the error amplifier 22 selectively receives, as an input signal, the reference voltage Vref in the on period $T_{ON}$, and the hold detection voltage VsH in the off period $T_{OFF}$. The switch SW2 receives the reference voltage Vref and the hold detection voltage VsH. When the control signal is high level (on period $T_{ON}$), the switch SW2 selects the reference voltage Vref, and when the control signal is low level (off period $T_{OFF}$), the switch SW2 outputs the hold detection signal VsH.

The error amplifier 22 generates an error signal Verr that corresponds to the difference between the voltage at the non-inverting input terminal and the lowest of the voltages at the multiple inverting input terminals. A resistor R7 and a capacitor C3, which are used to perform phase compensation, are arranged in series between the output terminal of the error amplifier 22 and the ground terminal. The resistor R7 and the capacitor C3 are externally connected to the FB terminal of the control IC 100.

A switch SW3 receives a fixed voltage Vdd and the detection voltage Vs. In the on period $T_{ON}$, the switch SW3 outputs the fixed voltage Vdd, and in the off period $T_{OFF}$, the switch SW3 outputs the detection voltage Vs. The fixed voltage Vdd is set to be higher than the voltage that can be attained by each of the multiple LED terminal voltages $V_{LED1}$ through $V_{LEDn}$ in the on period $T_{ON}$. For example, the fixed voltage Vdd is configured as the power supply voltage.

By determining the fixed voltage Vdd as described above, such an arrangement provides a feedback control operation based upon the LED terminal voltages $V_{LED1}$ through $V_{LEDn}$ in the on period $T_{ON}$. That is to say, the error amplifier 22 outputs an error signal Verr that corresponds to the difference between the reference voltage Vref and the lowest of the LED terminal voltages $V_{LED}$ in the on period $T_{ON}$, and outputs an error signal Verr that corresponds to the difference between the detection voltage Vs and the hold detection voltage VsH in the off period $T_{OFF}$.

As the control method for the switching power supply 4, pulse width modulation (PWM) and pulse frequency modulation (PFM) are employed. The PWM method is highly responsive to the load, and the PFM method is highly efficient in the light load state. Thus, in the on period $T_{ON}$, in which the load is relatively heavy, the pulse modulator 19 generates the pulse signal $S_{MOD}$ by means of pulse width modulation. In the off period $T_{OFF}$, which is a light load state, the pulse modulator 19 generate the pulse signal $S_{MOD}$ by means of pulse frequency modulation. Thus, such an arrangement provides the advantages of both high responsiveness to the load in the heavy load state and high efficiency in the light load state.

The output signal Verr of the error amplifier 22 is input to the input terminal of the switch SW4. In the on period $T_{ON}$, the switch SW4 activates a path to the pulse width modulator 20 side, and in the off period $T_{OFF}$, the switch SW4 activates a path to the pulse frequency modulator 27 side.

In the on period $T_{ON}$, the pulse width modulator 20 is active, and generates a pulse signal Spwm having a duty ratio that corresponds to the error signal Verr. For example, the pulse width modulator 20 includes an oscillator 24 and a PWM comparator 26. The oscillator 24 generates a cyclic voltage Vosc having a triangle waveform or a sawtooth waveform. When the switch SW4 activates a path to the pulse width modulator 20 side, a feedback voltage $V_{FB}$ occurs at the FB terminal, which corresponds to the difference between the LED terminal voltage $V_{LED}$ and the reference voltage Vref. The PWM comparator 26 compares the feedback voltage $V_{FB}$ with the cyclic voltage Vosc, and generates the PWM signal Spwm having a level that corresponds to the comparison result.

The pulse frequency modulator 27 is active in the off period $T_{OFF}$. The pulse frequency modulator 27 may be configured as a known pulse frequency modulator. When the switch SW4 activates a path to the pulse frequency modulator 27 side, the output terminal of the error amplifier 22 is disconnected from the resistor R7 and the capacitor C3. As a result, the error amplifier 22 operates like a voltage comparator. Thus, the error signal Verr has an edge at a timing at which the detection voltage Vs crosses the hold detection voltage VsH. The pulse frequency modulator 27 generates a PFM signal Spfm which is set to high level for a predetermined period (minimum on period) on receiving an edge of the error signal Verr. While the switching transistor M1 is turned on in the minimum on period, the output voltage Vout slightly rises. Subsequently, the switching transistor M1 is continuously set to off, which reduces the output voltage Vout. Subsequently, when the detection voltage Vs falls to the hold detection voltage VsH, an edge occurs again in the error signal Verr, which turns on the switching transistor M1. Such an operation is repeated in the PFM control operation.

It should be noted that the FB terminal is set to the high impedance state in a state in which the switch SW4 activates a path to the pulse frequency modulator 27 side in the off period $T_{OFF}$, and accordingly, the feedback voltage $V_{FB}$ that occurs at the FB terminal is held. Thus, such an arrangement prevents the feedback voltage $V_{FB}$ from being discontinuous when returning to the on period $T_{ON}$ from the off period $T_{OFF}$.

In the on period $T_{ON}$, the pulse modulator 19 outputs the PWM signal Spwm as the pulse signal $S_{MOD}$. In the off period $T_{OFF}$, the pulse modulator 19 outputs the PFM signal Spfm as the pulse signal $S_{MOD}$. The driver 28 drives the switching transistor M1 according to the pulse signal $S_{MOD}$.

The above is the configuration of the control IC 100.

Figure 3:
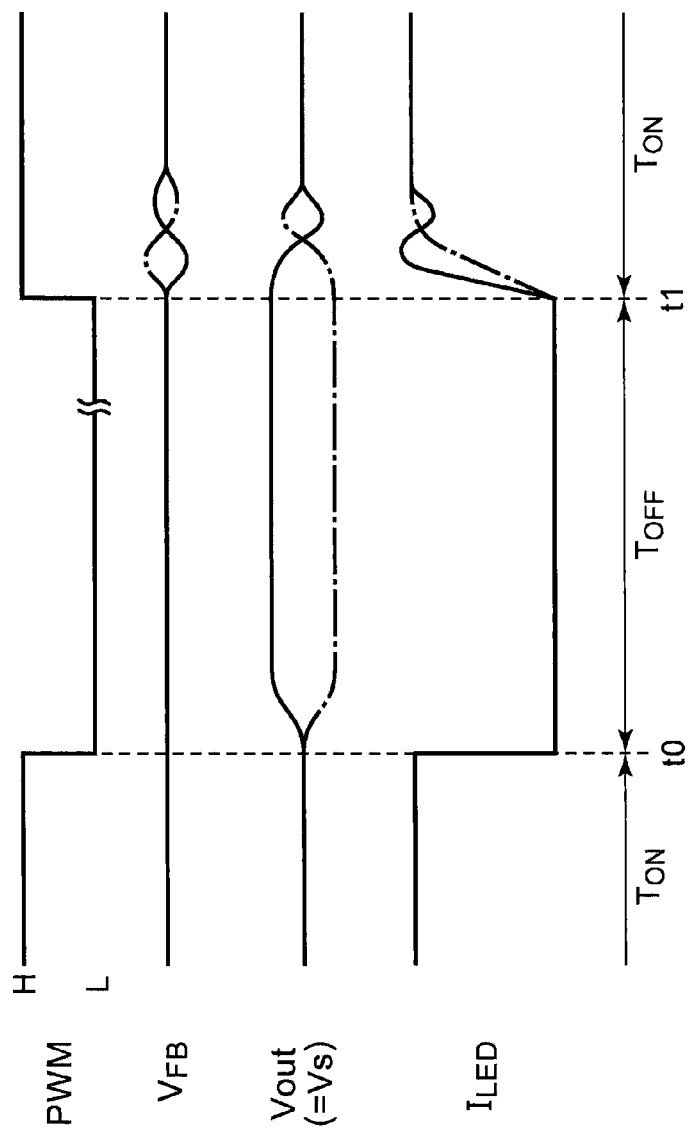
FIG. 3 is a waveform diagram which shows the operation of the light emitting apparatus shown in FIG. 2.

Next, description will be made regarding the operation of the light emitting apparatus 3. FIG. 3 is a waveform diagram which shows the operation of the light emitting apparatus 3 shown in FIG. 2. From the top and in the following order, FIG. 3 shows the control signal PWM, the feedback voltage $V_{FB}$ (solid line), the output voltage Vout (solid line), and the driving current $I_{LED}$ (solid line). The vertical axis and the horizontal axis in the waveform diagrams and the time charts in the present specification are expanded or reduced as appropriate for ease of understanding. Also, each waveform shown in the drawing is simplified for ease of understanding.

Before the time point t0, the control signal PWM is set to high level, which corresponds to the on period $T_{ON}$. In this period, the driving currents $I_{LED1}$ through $I_{LEDn}$ are respectively supplied to the LED strings 6_1 through 6_n. With the voltage drops that occur at the respective LED strings 6_1 through 6_n as $Vf_1$ through $Vf_n$, the LED terminal voltages $V_{LED1}$ through $V_{LEDn}$ are respectively represented by (Vout−$Vf_1$) through (Vout−$Vf_n$). That is to say, as a larger voltage drop Vf occurs at a channel, the LED terminal voltage $V_{LED}$ becomes lower at that channel.

In the on period $T_{ON}$, the output voltage Vout is maintained such that the reference voltage Vref matches the lowest of the voltages $V_{LED}$ at the multiple LED terminals. Furthermore, in this stage, the sample-and-hold circuit 30 generates the hold detection voltage VsH, which is slightly higher than the detection voltage Vs that occurs in the on period $T_{ON}$.

When the control signal PWM is switched to low level at the time point t0, the period is switched to the off period $T_{OFF}$. In this state, the driving current $I_{LED}$ becomes zero, and accordingly, the voltage drop that occurs at each of the channels, i.e., at each of the LED strings 6_1 through 6_n, becomes zero. As a result, the LED terminal voltage $V_{LED}$ rises to the vicinity of the output voltage Vout.

In the off period $T_{OFF}$, a feedback control operation is performed on the output voltage Vout such that the detection voltage Vs becomes equal to the hold detection voltage VsH. That is to say, in the off period $T_{OFF}$, the output voltage Vout (Vs) is held at a level that is slightly higher than the output voltage Vout (Vs) generated in the previous on period $T_{ON}$ immediately before the current off period $T_{OFF}$.

Furthermore, in the off period $T_{OFF}$, the FB terminal is disconnected from the error amplifier 22. Thus the feedback voltage $V_{FB}$ is maintained in the off period $T_{OFF}$ at approximately the same voltage level as that in the on period $T_{ON}$.

At the time point t1, the control signal PWM is switched to high level, thereby switching to the on period $T_{ON}$. In this stage, the output voltage Vout is maintained at a sufficiently high voltage, which allows the driving current $I_{LED}$ to immediately flow through the LED strings 6. Thus, such an arrangement requires only a short period of time for light to be emitted.

When the switch SW4 is connected to the pulse width modulator 20 side at the time point t1, a feedback control operation is resumed via a path including the error amplifier 22 and the pulse width modulator 20. In this stage, the voltage $V_{FB}$ at the FB terminal is maintained at the same voltage level as that in the previous on period. Thus, such an arrangement is capable of returning the output voltage Vout to the previous voltage level in a short period of time.

Figure 4A:
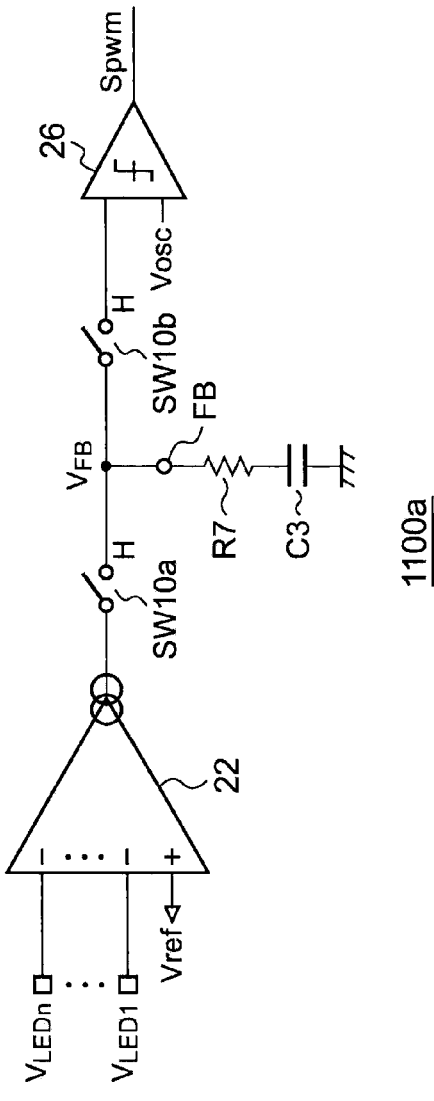
FIGS. 4A and 4B are circuit diagrams each showing a configuration of a control IC according to a comparison technique.
Figure 4B:
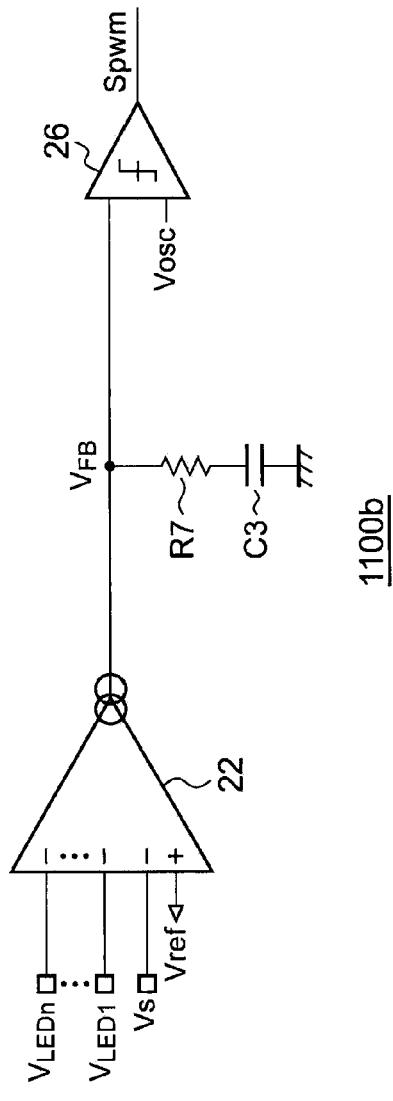

The above is the operation of the light emitting apparatus 3. The advantages of the light emitting apparatus can be clearly understood in comparison with comparison techniques. FIGS. 4A and 4B are circuit diagrams respectively showing control ICs 1100a and 1100b according comparison techniques.

With the control IC 1100a shown in FIG. 4A, the switches SW10a and SW10b are turned on in the on period $T_{ON}$, and are turned off in the off period $T_{OFF}$. Accordingly, in the on period $T_{ON}$, the duty ratio of the pulse signal Spwm is adjusted such that the reference voltage Vref matches the lowest of the LED terminal voltages $V_{LED1}$ through $V_{LEDn}$. In the off period $T_{OFF}$, the switches SW10a and SW10b are turned off, which disconnects the feedback circuit. In this state, the control operation for the switching transistor M1 is stopped. As a result, the output voltage Vout gradually drops due to self-discharge.

In the off period $T_{OFF}$, the switches SW10a and SW10b are turned off, which sets the FB terminal to the high-impedance state. In this state, the feedback voltage $V_{FB}$ is maintained at a constant voltage level. Subsequently, after switching to the next on period $T_{ON}$, the duty ratio control operation for the switching transistor M1 is resumed with the feedback voltage $V_{FB}$ thus held as the start point, thereby returning the output voltage Vout, which had dropped due to self-discharge, to the previous voltage level.

As described above, with the control IC 1100a shown in FIG. 4A, the feedback control operation is stopped in the off period $T_{OFF}$, leading to a reduction in the output voltage Vout due to self-discharge. Accordingly, a long off period $T_{OFF}$ leads to an extreme reduction in the output voltage Vout, and thus a long period of time is required to return the output voltage Vout to the previous voltage level in the next on period $T_{ON}$. That is to say, such an arrangement has a problem in that a long period of time is required to turn on the LED strings 6 again.

With the control IC 1100b shown in FIG. 4B, in the on period $T_{ON}$, the duty ratio of the pulse signal Spwm is adjusted such that the reference voltage Vref matches the lowest of the LED terminal voltages $V_{LED1}$ through $V_{LEDn}$. Furthermore, in the off period $T_{OFF}$, the duty ratio of the pulse signal Spwm is adjusted such that the reference voltage Vref matches the detection voltage Vs that corresponds to the output voltage Vout.

In a given off period $T_{OFF}$, a feedback control operation is performed such that the reference voltage Vref matches the detection voltage Vs obtained by dividing the output voltage Vout. The voltage level of the output voltage Vout in this state is represented by Vout1.

In the next on period $T_{ON}$, if the feedback control operation is performed such that the reference voltage Vref matches the LED terminal voltage $V_{LED1}$, the target value Vout2 of the output voltage Vout is represented by Vout2=Vtef+Vf$_1$. Here, Vf$_1$ represents the voltage drop that occurs when the driving current $I_{LED1}$ flows through the LED string 6_1.

That is to say, if there is a large difference between the voltage level Vout1 of the output voltage Vout in the off period $T_{OFF}$ and the target voltage Vout2 in the on period $T_{ON}$, a long period of time is required to raise the output voltage Vout up to the voltage level required to turn on the LED strings 6. This leads to a long period of time being required to turn on the LED strings 6 again, which is a problem.

As represented by the waveform shown in FIG. 3, with the light emitting apparatus 3 shown in FIG. 2, the output voltage Vout is maintained at a suitable voltage level in both the on period $T_{ON}$ and the off period $T_{OFF}$, and fluctuation in the voltage level can be suppressed. This provides an advantage of a reduced period of time being required to turn on the LED strings 6.

Furthermore, the control IC 100 shown in FIG. 2 generates the hold detection voltage VsH that is slightly higher than the detection voltage Vs that occurs in the on period $T_{ON}$. Accordingly, even if the voltage drop Vf that occurs in a given on period is greater than that which occurred in the previous on period, i.e., even if the driving current $I_{LED}$ is switched to a higher level, a sufficiently high output voltage Vout is supplied to the LED strings 6, and thereby only a short period of time is required to emit light.

However, in some cases, such an arrangement configured to generate the hold detection voltage VsH that is slightly higher than the detection voltage Vs that occurs in the on period $T_{ON}$ has the following problem. That is to say, in a case in which the output voltage Vout is maintained in the off period $T_{OFF}$ at a level higher than that which occurs in the on period $T_{ON}$, in some cases, undershoot momentarily occurs in the output voltage Vout immediately after the transition to the next on period $T_{ON}$. FIG. 3 shows such a situation. Such undershoot that occurs in the output voltage Vout leads to fluctuation in the driving current $I_{LED}$ resulting in a slight fluctuation in the luminance. In some cases, depending on the application, such fluctuation in luminance would amount to an undesirable situation.

In such a case, contrary to the circuit shown in FIG. 2, the hold detection voltage VsH should be generated so as to be slightly lower than the detection voltage Vs that occurs in the on period $T_{ON}$. The sample-and-hold circuit 30 may be configured to be capable of generating such a hold detection voltage VsH, which can be designed by those skilled in this art based upon the circuit diagram shown in FIG. 2. As an example, an arrangement may be made in which the transistor M3 is eliminated, the resistor R6 is shorted to the ground, and a resistor R8 is arranged between the inverting input terminal of the operational amplifier OA1 and the source of the transistor M2. In this case, the hold detection voltage VsH is represented by VsH=Vs×R5/(R5+R8).

With such an arrangement, the waveforms are represented by the lines of dashes and dots shown in FIG. 3. Although such an arrangement has a disadvantage of a slightly increased period of time being required for the driving current $I_{LED}$ to reach the target level, such an arrangement suppresses ripple, thereby preventing flicker. It should be noted that such an arrangement also requires only a short period of time for the LED strings 6 to be illuminated, as compared with the configurations shown in FIGS. 4A and 4B.

Also, an arrangement may be made that is configured to generate the hold detection voltage VsH having the same voltage level as that of the detection voltage Vs that occurs in the on period $T_{ON}$. Such an arrangement provides characteristics that are intermediate between those represented by the solid lines and those represented by the lines of dashes and dots. With such an arrangement, the buffer 32 may be configured as a so-called voltage follower circuit.

That is to say, by optimizing the voltage level of the hold detection voltage VsH, such an arrangement is capable of providing the optimum waveform for an application of the light emitting apparatus 3.

Next, description will be made regarding another technique for suppressing fluctuation in the output voltage Vout.

In some cases, with the light emitting apparatus 3 shown in FIG. 2, the on periods of the respective LED strings 6_1 through 6_n are shifted in a temporal manner. With such an arrangement, the number of LED strings 6 that are to be simultaneously turned on changes over time. This means that fluctuation occurs in the load of the switching power supply 4. Accordingly, this leads to fluctuation in the output voltage Vout, which becomes a factor contributing to fluctuation in luminance.

Figure 5:
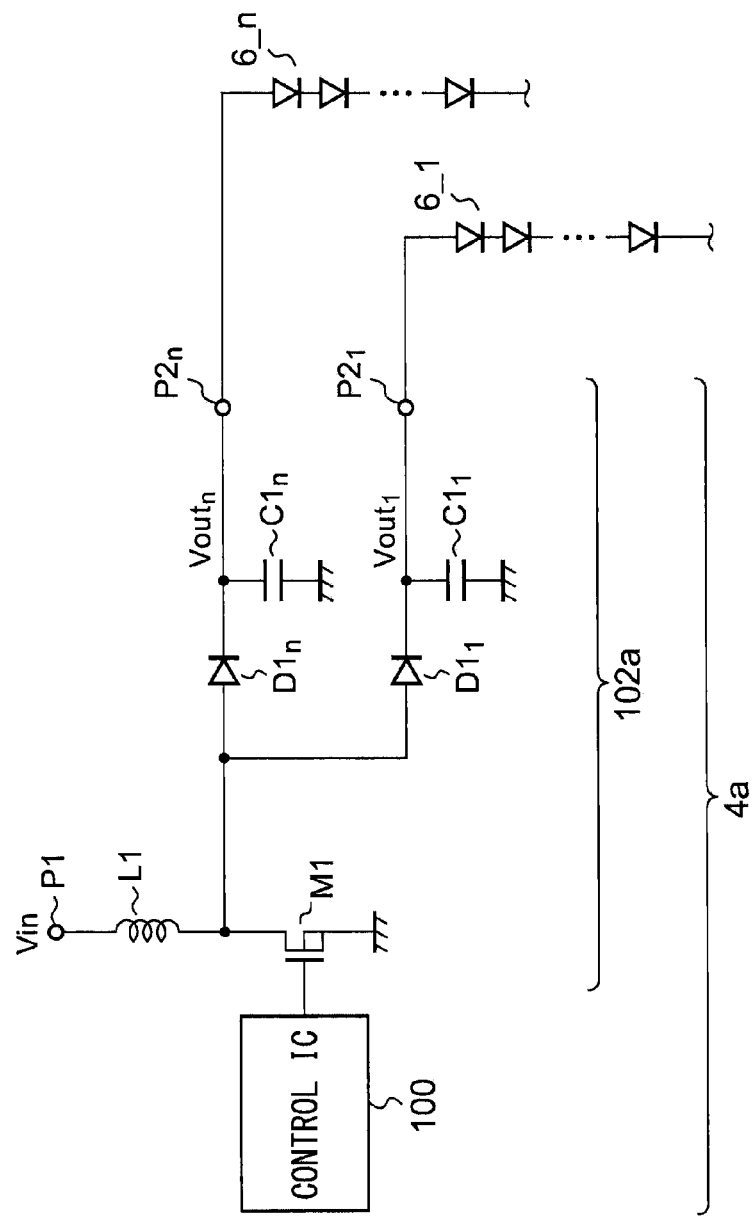
FIG. 5 is a circuit diagram which shows a configuration of a switching power supply according to a modification.

FIG. 5 is a circuit diagram which shows configuration of a switching power supply 4a according to a modification. An output circuit 102a shown in FIG. 5 includes output terminals $P2_1$ through $P2_n$ respectively provided to the multiple LED strings 6_1 through 6_n. One terminal of each of the multiple rectifier diodes $D1_1$ through $D1_n$ is connected to a corresponding one of the output terminals $P2_1$ through $P2_n$. Furthermore, the other terminal of each rectifier diode is connected to a connection node that connects the switching transistor M1 and the inductor L1. Multiple output capacitors $C1_1$ through $C1_n$ are arranged between the respective output terminals $P2_1$ through $P2_n$ and the fixed voltage terminal (ground terminal).

Figure 6A:
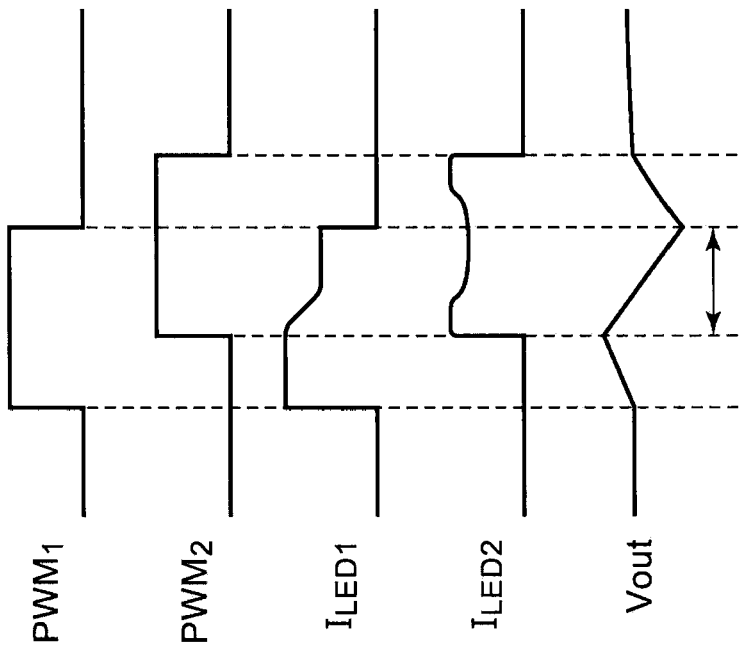
FIGS. 6A and 6B are waveform diagrams showing the operation of the switching power supply shown in FIG. 5 and the operation of the switching power supply shown in FIG. 2, respectively.
Figure 6B:
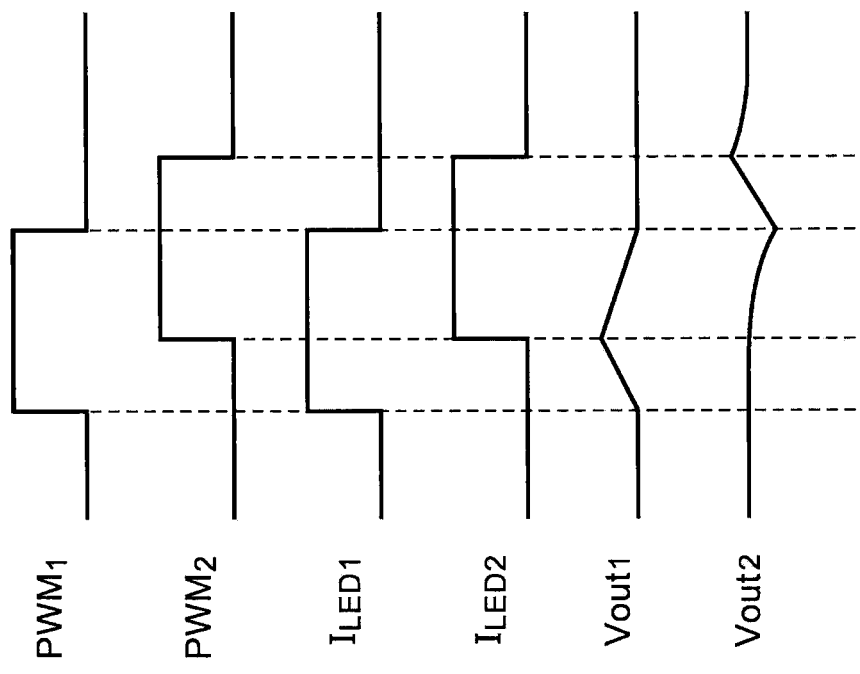

FIG. 6A is a waveform diagram which shows the operation of the switching power supply 4a shown in FIG. 5. FIG. 6A shows the operation of an arrangement in which n=2. As a comparative example, FIG. 6B shows the waveform diagram in a case in which the output circuit 102 shown in FIG. 2 is employed. In a case in which the output circuit 102 shown in FIG. 2 is employed, if the response speed of the feedback loop is insufficient, the output voltage Vout drops in a period in which the LED strings 6_1 and 6_2 are turned on at the same time. In some cases, this leads to reduction in the driving currents $I_{LED1}$ and $I_{LED2}$, resulting in a reduction in luminance.

In contrast, with the switching power supply 4a shown in FIG. 5, the output voltages Vout are independently generated for each individual load, as shown in FIG. 6A. This reduces fluctuation in each output voltage Vout, thereby suppressing fluctuation in the driving currents $I_{LED1}$ and $I_{LED2}$.

Description has been made regarding the prevent invention with reference to the embodiments. The above-described embodiments have been described for exemplary purposes only, and are by no means intended to be interpreted restrictively. Rather, various modifications may be made by making various combinations of the aforementioned components or processes, which are also encompassed in the technical scope of the present invention. Description will be made below regarding such modifications.

Description has been made in the embodiment regarding an arrangement in which the control IC 100 performs the PFM control operation in the off period $T_{OFF}$. Also, the control IC 100 may perform the PWM control operation in the off period $T_{OFF}$.

Description has been made in the embodiment regarding a non-isolated switching power supply employing an inductor. Also, the present invention can be applied to an isolated switching power supply employing a transformer.

Description has been made in the embodiment regarding an electronic device as an application of the light emitting apparatus 3. However, the application of the light emitting apparatus 3 is not restricted in particular. Also, the light emitting apparatus 3 can be applied to an illumination device and so forth.

The settings of the logical signals, such as the high-level state and the low-level state of the signals, have been described in the present embodiment for exemplary purposes only. The settings can be freely modified by inverting the signals using inverters or the like.

While the preferred embodiments of the present invention have been described using specific terms, such description is for illustrative purposes only, and it is to be understood that changes and variations may be made without departing from the spirit or scope of the appended claims.

What is claimed is:

1. A control circuit for a switching power supply configured to supply a driving voltage to one terminal of a light emitting element configured to be intermittently driven, the control circuit comprising:

a sample-and-hold circuit configured to (i) sample a detection voltage that corresponds to the driving voltage generated in an on period of the light emitting element, and (ii) to hold the detection voltage thus sampled and to output a hold detection voltage that corresponds to the detection voltage in an off period of the light emitting element, the hold detection voltage being higher than the detection voltage;

a pulse modulator configured to generate a pulse signal having a duty ratio adjusted in an off period of the light emitting element such that the detection voltage matches a hold detection voltage output from the sample-and-hold circuit; and a driver configured to drive a switching element of the switching power supply according to the pulse signal.

2. A control circuit according to claim 1, wherein the sample-and-hold circuit comprises:

a capacitor arranged such that one terminal thereof is set to a fixed electric potential in the on period;

a buffer configured to generate a voltage that corresponds to the detection voltage; and a switch arranged between the other terminal of the capacitor and an output terminal of the buffer, and configured to switch on in the on period of the light emitting element, and to switch off in the off period thereof, and wherein the voltage that occurs at the capacitor is output as the hold detection voltage.

3. A control circuit according to claim 1, wherein the pulse modulator is configured to adjust the duty ratio of the pulse signal in the on period of the light emitting element such that a voltage that occurs at the other terminal of the light emitting element matches a predetermined reference voltage.

4. A control circuit according to claim 2, wherein the pulse modulator is configured to adjust the duty ratio of the pulse signal in the on period of the light emitting element such that a voltage that occurs at the other terminal of the light emitting element matches a predetermined reference voltage.

5. A control circuit according to claim 3, comprising:

an error amplifier arranged such that the voltage that occurs at the other terminal of the light emitting element is input to a first input terminal thereof, the detection voltage is input to a second input terminal thereof, and a third input terminal thereof selectively receives, as an input signal, the reference voltage in the on period and the hold detection voltage in the off period, and which is configured to output an error signal that corresponds to the difference between the reference voltage and the voltage that occurs at the other terminal of the light emitting element in the on period, and to output an error signal that corresponds to the difference between the detection voltage and the hold detection voltage in the off period;

a pulse width modulator configured to generate, in the on period, a pulse signal having a duty ratio that corresponds to the error signal; and a pulse frequency modulator configured to generate, in the off period, a pulse signal having a duty ratio that corresponds to the error signal.

6. A control circuit according to claim 4, comprising:

an error amplifier arranged such that the voltage that occurs at the other terminal of the light emitting element is input to a first input terminal thereof, the detection voltage is input to a second input terminal thereof, and a third input terminal thereof selectively receives, as an input signal, the reference voltage in the on period and the hold detection voltage in the off period, and which is configured to output an error signal that corresponds to the difference between the reference voltage and the voltage that occurs at the other terminal of the light emitting element in the on period, and to output an error signal that corresponds to the difference between the detection voltage and the hold detection voltage in the off period;

a pulse width modulator configured to generate, in the on period, a pulse signal having a duty ratio that corresponds to the error signal; and a pulse frequency modulator configured to generate, in the off period, a pulse signal having a duty ratio that corresponds to the error signal.

7. A control circuit according to claim 5, wherein the pulse modulator further comprises:

a feedback terminal via which a resistor and a capacitor, which are used for phase compensation, are connected;

a switch configured to receive the error signal, and to output the error signal thus received to the feedback terminal in the on period, and to output the error signal thus received to the pulse frequency modulator in the off period, and wherein the pulse width modulator is configured to generate the pulse signal according to a voltage at the feedback terminal.

8. A control circuit according to claim 6, wherein the pulse modulator further comprises:

a feedback terminal via which a resistor and a capacitor, which are used for phase compensation, are connected;

a switch configured to receive the error signal, and to output the error signal thus received to the feedback terminal in the on period, and to output the error signal thus received to the pulse frequency modulator in the off period, and wherein the pulse width modulator is configured to generate the pulse signal according to a voltage at the feedback terminal.

9. A light emitting apparatus comprising:

a light emitting element;

a switching power supply configured to supply a driving voltage to one terminal of the light emitting element; and a current driving circuit connected to the other terminal of the light emitting element, and configured to supply an intermittent driving current that corresponds to a target luminance, wherein the switching power supply comprises:

an output circuit comprising a switching element; and a control circuit configured to drive the switching element, the control circuit comprising:

a sample-and-hold circuit configured to (i) sample a detection voltage that corresponds to the driving voltage generated in an on period of the light emitting element, and (ii) to hold the detection voltage thus sampled and to output a hold detection voltage that corresponds to the detection voltage in an off period of the light emitting element, the hold detection voltage being higher than the detection voltage;

a pulse modulator configured to generate a pulse signal having a duty ratio adjusted in an off period of the light emitting element such that the detection voltage matches a hold detection voltage output from the sample-and-hold circuit; and a driver configured to drive a switching element of the switching power supply according to the pulse signal.

10. A light emitting apparatus comprising:

a plurality of light emitting elements;

a switching power supply configured to supply an independent driving voltage to one terminal of each of the plurality of light emitting elements; and a current driving circuit configured to supply, to each of the plurality of light emitting elements, an intermittent driving current that corresponds to a target luminance, wherein the switching power supply comprises:

an output circuit comprising a switching element; and a control circuit configured to drive the switching elements, and wherein the control circuit comprises:

a sample-and-hold circuit configured to (i) sample a detection voltage that corresponds to the driving voltage generated in an on period of the light emitting element, and (ii) to hold the detection voltage thus sampled and to output a hold detection voltage that corresponds to the detection voltage in an off period of the light emitting element, the hold detection voltage being higher than the detection voltage;

a pulse modulator configured to generate a pulse signal having a duty ratio adjusted in an off period of the light emitting element such that the detection voltage matches a hold detection voltage output from the sample-and-hold circuit; and a driver configured to drive a switching element of the switching power supply according to the pulse signal, and wherein the output circuit comprises:

an input terminal via which an input voltage is to be applied;

a plurality of output terminals via which the driving voltages are respectively output to the respective multiple light emitting elements;

an inductor and a switching element sequentially connected in series between the input terminal and a fixed voltage terminal;

a plurality of rectifier elements respectively provided to the multiple output terminals, and arranged such that one terminal of each of the rectifier elements is connected to a corresponding output terminal, and the other terminal of each of the rectifier elements is connected to a connection node that connects the inductor and the switching element; and a plurality of output capacitors respectively provided to the multiple output terminals, and each arranged between a corresponding output terminal and the fixed voltage terminal.

11. An electronic device comprising:

a liquid crystal panel; and a light emitting apparatus arranged as a backlight of the liquid crystal panel, the light emitting apparatus comprising:

a light emitting element;

a switching power supply configured to supply a driving voltage to one terminal of the light emitting element; and a current driving circuit connected to the other terminal of the light emitting element, and configured to supply an intermittent driving current that corresponds to a target luminance, wherein the switching power supply comprises:

an output circuit comprising a switching element; and a control circuit configured to drive the switching element, the control circuit comprising:

a sample-and-hold circuit configured to (i) sample a detection voltage that corresponds to the driving voltage generated in an on period of the light emitting element, and (ii) to hold the detection voltage thus sampled and to output a hold detection voltage that corresponds to the detection voltage in an off period of the light emitting element, the hold detection voltage being higher than the detection voltage;

a pulse modulator configured to generate a pulse signal having a duty ratio adjusted in an off period of the light emitting element such that the detection voltage matches a hold detection voltage output from the sample-and-hold circuit; and a driver configured to drive a switching element of the switching power supply according to the pulse signal.

12. An electronic device comprising:

a liquid crystal panel; and a light emitting apparatus arranged as a backlight of the liquid crystal panel, the light emitting apparatus comprising:

a plurality of light emitting elements;

a switching power supply configured to supply an independent driving voltage to one terminal of each of the plurality of light emitting elements; and a current driving circuit configured to supply, to each of the plurality of light emitting elements, an intermittent driving current that corresponds to a target luminance, wherein the switching power supply comprises:

an output circuit comprising a switching element; and a control circuit configured to drive the switching elements, and wherein the control circuit comprises:

a sample-and-hold circuit configured to (i) sample a detection voltage that corresponds to the driving voltage generated in an on period of the light emitting element, and (ii) to hold the detection voltage thus sampled and to output a hold detection voltage that corresponds to the detection voltage in an off period of the light emitting element, the hold detection voltage being higher than the detection voltage;

a pulse modulator configured to generate a pulse signal having a duty ratio adjusted in an off period of the light emitting element such that the detection voltage matches a hold detection voltage output from the sample-and-hold circuit; and a driver configured to drive a switching element of the switching power supply according to the pulse signal, and wherein the output circuit comprises:

an input terminal via which an input voltage is to be applied;

a plurality of output terminals via which the driving voltages are respectively output to the respective multiple light emitting elements;

an inductor and a switching element sequentially connected in series between the input terminal and a fixed voltage terminal;

a plurality of rectifier elements respectively provided to the multiple output terminals, and arranged such that one terminal of each of the rectifier elements is connected to a corresponding output terminal, and the other terminal of each of the rectifier elements is connected to a connection node that connects the inductor and the switching element; and a plurality of output capacitors respectively provided to the multiple output terminals, and each arranged between a corresponding output terminal and the fixed voltage terminal.

* * * * *